US012807162B2

(12) United States Patent
Satoh

(10) Patent No.: US 12,807,162 B2
(45) Date of Patent: Nov. 24, 2026

(54) VEHICLE CONTROL DEVICE AND VEHICLE CONTROL METHOD

(71) Applicant: Hitachi Astemo, Ltd., Hitachinaka (JP)

(72) Inventor: Seiichi Satoh, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 57 days.

(21) Appl. No.: 18/848,391

(22) PCT Filed: Jun. 27, 2022

(86) PCT No.: PCT/JP2022/025472

§ 371 (c)(1),
(2) Date: Sep. 18, 2024

(87) PCT Pub. No.: WO2024/003974

PCT Pub. Date: Jan. 4, 2024

(65) Prior Publication Data

US 2025/0206317 A1 Jun. 26, 2025

(51) Int. Cl.
*B60W 40/02* (2006.01)
*B60W 60/00* (2020.01)
(Continued)

(52) U.S. Cl.
CPC .......... *B60W 40/02* (2013.01); *B60W 60/001* (2020.02); *G01C 21/28* (2013.01);
(Continued)

(58) Field of Classification Search
CPC ............................... G08G 1/167; B60W 40/02
(Continued)

(56) References Cited

U.S. PATENT DOCUMENTS

2014/0188365 A1* 7/2014 Nagata ................ B60W 30/143
701/93
2023/0015466 A1 1/2023 Jiralerspong et al.

FOREIGN PATENT DOCUMENTS

JP 2001-034898 A 2/2001
JP 2016030513 A * 3/2016
(Continued)

OTHER PUBLICATIONS

International Search Report and Written Opinion with English translations of International Patent Application No. PCT/JP2022/025472 dated Sep. 13, 2022 (10 pages).

*Primary Examiner* — Helal A Algahaim
(74) *Attorney, Agent, or Firm* — Foley & Lardner LLP

(57) ABSTRACT

A vehicle control device includes: a map acquisition unit configured to acquire a three-dimensional map in which three-dimensional position information of a road or the like is set; a host vehicle information acquisition unit; a future position estimation unit that estimates a future position of the host vehicle at a future time based on a current position of the host vehicle; a blind spot area calculation unit that obtains a blind spot area shielded by a road or the like in a detection area of an external recognition sensor at the future time based on the three-dimensional map, the future position of the host vehicle, and sensor specification information indicating specifications of the external recognition sensor mounted on the host vehicle; and a vehicle control value determination unit that determines a current control value of the host vehicle based on the calculated blind spot area at the future time.

7 Claims, 10 Drawing Sheets

(51) Int. Cl.
*G01C 21/28* (2006.01)
*G08G 1/16* (2006.01)

(52) U.S. Cl.
CPC ..... *G08G 1/167* (2013.01); *B60W 2554/4046* (2020.02); *B60W 2556/50* (2020.02)

(58) Field of Classification Search
USPC ............................................................ 701/23
See application file for complete search history.

(56) References Cited

FOREIGN PATENT DOCUMENTS

| | | | | |
|---|---|---|---|---|
| JP | 2018106668 | A | * | 7/2018 |
| JP | 2021-084479 | A | | 6/2021 |
| JP | 2021-100827 | A | | 7/2021 |

* cited by examiner

VEHICLE CONTROL DEVICE AND VEHICLE CONTROL METHOD

TECHNICAL FIELD

The present invention relates to a vehicle control device and a vehicle control method.

BACKGROUND ART

In a vehicle such as an automobile, scenes in which an advanced driving assistance system or an automatic driving system is actually used are different depending on a combination of a road shape, a situation such as an automobile exclusive road with relatively few obstructions to an urban area with many obstructions and pedestrians, weather, and the like. In any of these scenes, the advanced driving assistance system and the automatic driving system must be designed so that the vehicle can travel safely.

In order to ensure the traveling safety of advanced driving assistance systems and automatic driving systems, it is essential to accurately sense the current surrounding environment of the host vehicle, and a technology for predicting the behavior of an object moving into a blind spot area based on the sensing result has been developed.

For example, PTL 1 discloses a technology of estimating a blind spot area generated by a road shape or a surrounding object using a sensing result at a current time and sensor characteristics.

CITATION LIST

Patent Literature

PTL 1: JP 2001-34898 A

SUMMARY OF INVENTION

Technical Problem

The technology described in PTL 1 is a technology for estimating a blind spot area in a sensing range at the current position of the host vehicle, and when the sensing range of an external recognition sensor mounted on the vehicle is narrow, a blind spot area is often determined. Therefore, depending on the sensor specification, there is a possibility that collision avoidance cannot be performed for an obstacle that suddenly appears from the blind spot area.

In addition, in the technology described in PTL 1, in a case of a scene where a main line cannot be sensed due to a tunnel wall or a slope and the vehicle suddenly merges with the main line, it is not possible to determine an appropriate timing for lane change to the main line simply by estimating the sensing blind spot area at the current position.

For this reason, it has been desired to realize appropriate vehicle control and determination of a traveling route in consideration of a blind spot area caused by traveling.

Solution to Problem

In order to solve the above problem, for example, the configuration described in the claims is adopted.

The present application includes a plurality of means for solving the above problems. As an example, a vehicle control device includes: a map acquisition unit configured to acquire a three-dimensional map in which three-dimensional position information of at least one of a feature and a road is set; a host vehicle information acquisition unit that acquires a current position of a host vehicle; a future position estimation unit that estimates a future position of the host vehicle at a future time based on the current position of the host vehicle; a blind spot area calculation unit that obtains a blind spot area shielded by at least one of a feature or a road in a detection area of an external recognition sensor at the future time based on the three-dimensional map, the future position of the host vehicle, and sensor specification information indicating specifications of at least one external recognition sensor mounted on the host vehicle; and a vehicle control value determination unit that determines a current control value of the host vehicle based on the blind spot area at the future time obtained by the blind spot area calculation unit.

Advantageous Effects of Invention

According to the present invention, it is possible to predict a dangerous scene in the medium to long term by calculating a sensable area at a future point of time for a host vehicle based on specifications of a sensor mounted on the host vehicle and map information, and specifying a blind spot area. As a result, it is possible to plan vehicle control and a driving plan for avoiding a dangerous scene sufficiently in advance.

Problems, configurations, and effects other than those described above will be clarified by the following description of embodiments.

DESCRIPTION OF EMBODIMENTS

Hereinafter, embodiments of the present invention will be described in order.

The embodiments of the present invention, as a vehicle control device that controls a vehicle, realize safe and smooth vehicle control by specifying a sensable area at a future point of time for a host vehicle, even in a scene where many blind spot areas occur.

Note that the sensable area in the present specification refers to an area obtained by converting a three-dimensional sensing area of the host vehicle assumed at a certain point of time into a vehicle horizontal reference based on specifications of a sensor mounted on the host vehicle and map information.

First Embodiment

Hereinafter, a first embodiment of the present invention will be described with reference to FIGS. 1 to 8.

[Configuration of Vehicle Control Device]

Figure 1:
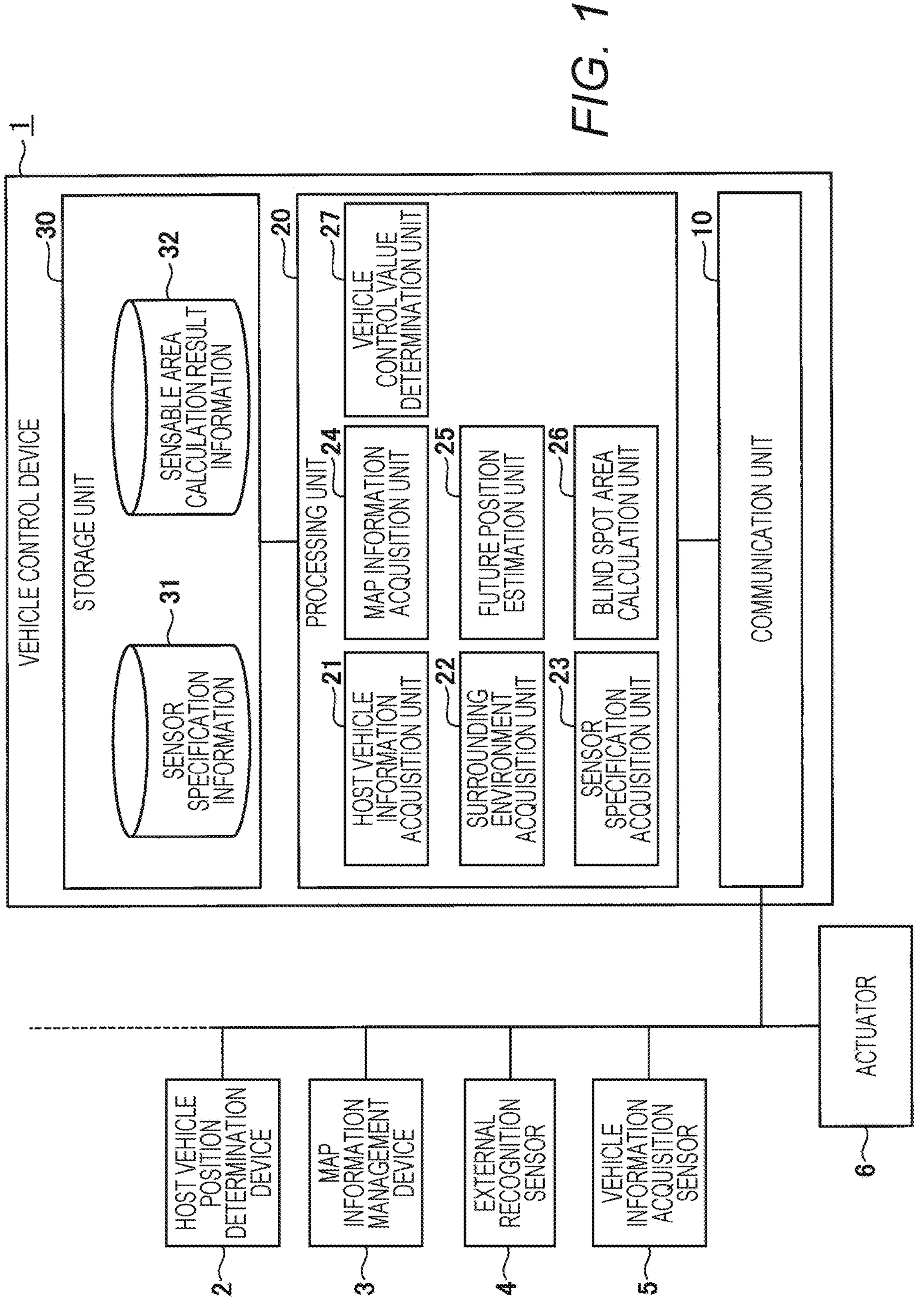
FIG. 1 is a block diagram illustrating a vehicle control device according to a first embodiment of the present invention and a surrounding configuration thereof.

FIG. 1 is a diagram illustrating a configuration of a vehicle control device according to a first embodiment.

A vehicle control device 1 illustrated in FIG. 1 is a vehicle control device for a vehicle including a safe driving assistance system that supports a part of a driving operation performed by a driver. Examples of the safe driving assistance system here include an inter-vehicular distance control device (Adaptive Cruise Control: hereinafter referred to as ACC) and a lane deviation prevention assistance system (Lane Keep Assist: hereinafter referred to as LKA).

Figure 2:
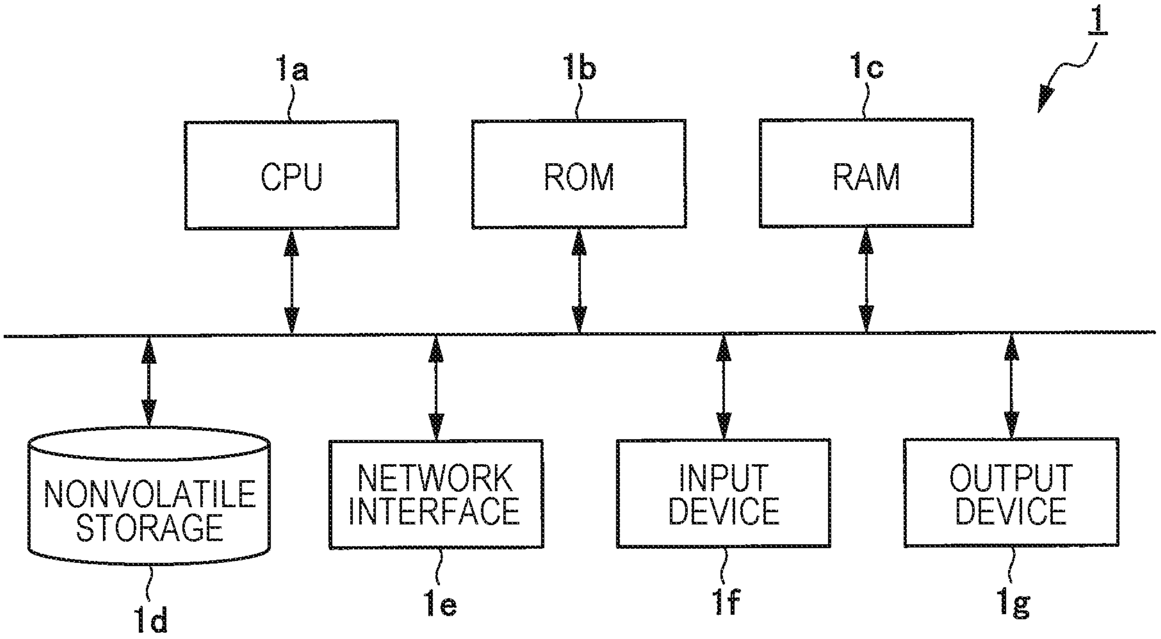
FIG. 2 is a block diagram illustrating a hardware configuration example of the vehicle control device according to the first embodiment of the present invention.

The vehicle control device 1 is configured as a computer as illustrated in FIG. 2 to be described below, and each function of the vehicle control device 1 to be described below is realized by a processor in the vehicle control device 1 executing an installed program.

The vehicle control device 1 includes a communication unit 10, a processing unit 20, and a storage unit 30.

The communication unit 10 transmits and receives information through the in-vehicle network. For the in-vehicle network, a controller area network (CAN), a CAN with flexible data rate (CAN FD), Ethernet (registered trademark), or the like can be applied.

The processing unit 20 calculates a sensable area at a future point of time based on the information input by the communication unit 10, specifies a blind spot area, and plans and sets a vehicle control amount. Examples of the vehicle control amount to be set include a target vehicle speed, a target acceleration, a target steering angle, and the like. The processing unit 20 sets at least one or more vehicle control amounts of the target vehicle speed, the target acceleration, the target steering angle, and the like.

The storage unit 30 includes a database that stores sensor specification information 31 for calculating the sensable area and sensable area calculation result information 32 that is a calculation result of the calculated sensable area.

The communication unit 10 exchanges information necessary for the vehicle control device 1 with the host vehicle position determination device 2, the map information management device 3, the external recognition sensor 4, the vehicle information acquisition sensor 5, the actuator 6, and the like.

The host vehicle position determination device 2 specifies the current position of the host vehicle by applying a global navigation satellite system (GNSS) or the like.

The map information management device 3 manages information related to a feature such as a road shape, a side wall, or a building.

The external recognition sensor 4 is one or a plurality of sensors that recognize the surrounding environment of the host vehicle. Examples of the external recognition sensor 4 include a camera, a radar, and Lidar.

The vehicle information acquisition sensor 5 acquires the current behavior state of the host vehicle. The current behavior state of the host vehicle includes speed, acceleration, yaw rate, and the like.

The actuator 6 moves the vehicle in response to a vehicle control command, and includes a driving device, a braking device, a steering device, and the like.

The processing unit 20 includes a host vehicle information acquisition unit 21, a surrounding environment acquisition unit 22, a sensor specification acquisition unit 23, a map information acquisition unit 24, a future position estimation unit 25, a blind spot area calculation unit 26, and a vehicle control value determination unit 27.

The host vehicle information acquisition unit 21 acquires information on the position and speed of the host vehicle.

The surrounding environment acquisition unit 22 acquires the surrounding environment of the host vehicle.

The sensor specification acquisition unit 23 acquires sensor specification information recognized by the external recognition sensor 4 mounted on the host vehicle.

The map information acquisition unit 24 acquires a road shape and feature information of a destination of the host vehicle. Here, examples of the road shape acquired by the map information acquisition unit 24 include a slope, a merge, a curve, and the like. The feature information acquired by the map information acquisition unit 24 includes a building, a tunnel, and the like.

The future position estimation unit 25 estimates a future position of the host vehicle (a future position).

The blind spot area calculation unit 26 calculates a blind spot area of the host vehicle assumed at the future position.

The vehicle control value determination unit 27 sets the vehicle control amount of the host vehicle based on the sensable area including blind spot area information calculated by the blind spot area calculation unit 26.

[Hardware Configuration of Vehicle Control Device]

FIG. 2 illustrates a hardware configuration example of a computer (information processing device) constituting the vehicle control device 1.

A computer constituting the vehicle control device 1 includes a central processing unit (CPU) 1*a* that is a processor, a read only memory (ROM) 1*b*, a random access memory (RAM) 1*c*, and a nonvolatile storage 1*d*. As the nonvolatile storage 1*d*, for example, a hard disk drive (HDD) or a solid state drive (SSD) is used.

In addition, the computer constituting the vehicle control device 1 includes a network interface 1*e*, an input device 1*f*, and an output device 1*g*.

The CPU 1*a* causes the RAM 1*c* to execute a program stored in the ROM 1*b* or the nonvolatile storage 1*d*, thereby causing the RAM 1*c* to configure the processing unit 20 (FIG. 1).

The nonvolatile storage 1*d* stores a program for performing vehicle control and the like, and stores information as a database such as the sensor specification information 31 and the sensable area calculation result information 32.

The network interface 1*e* has a transmission/reception function of the communication unit 10 illustrated in FIG. 1.

The input device 1*f* receives an input of information from a sensor or the like connected to the vehicle control device 1.

The output device 1*g* outputs a control signal to an actuator or the like connected to the vehicle control device 1.

[Control Processing by Vehicle Control Device]

Figure 3:
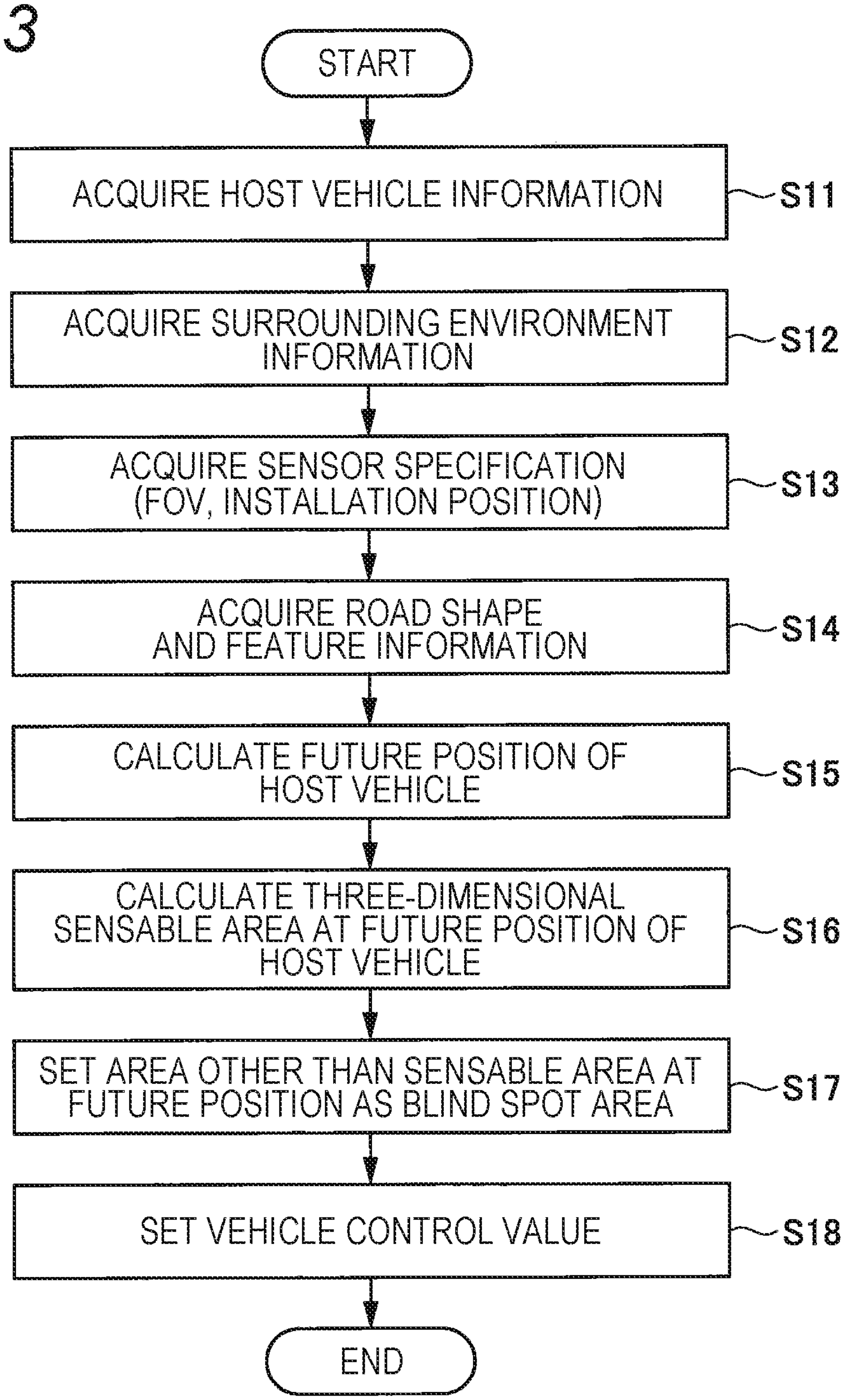
FIG. 3 is a flowchart illustrating an example of control processing by the vehicle control device according to the first embodiment of the present invention.

FIG. 3 is a flowchart illustrating processing performed by the processing unit 20 of the vehicle control device 1 according to the present embodiment.

First, the host vehicle information acquisition unit 21 acquires the host vehicle information in association with the vehicle behavior at the current position of the host vehicle using the current host vehicle position information specified by the host vehicle position determination device 2 and the behavior information of the host vehicle such as the speed, the acceleration, and the yaw rate that can be acquired by the vehicle information acquisition sensor 5 (host vehicle information acquisition processing: step S11).

Next, the surrounding environment acquisition unit 22 acquires information such as the position, movement, weather, and road surface condition of a surrounding object (vehicle, pedestrian, bicycle, motorcycle, and the like) that obstruct the travel of the host vehicle from the results detected by one or a plurality of external recognition sensors (surrounding environment information acquisition processing: step S12).

In addition, the sensor specification acquisition unit 23 reads specification information (installation position, maximum sensing distance, horizontal/vertical viewing angle, and sensor type) of the external recognition sensor mounted on the host vehicle stored as the sensor specification information 31 included in the storage unit 30 (step S13). Here, the sensor type is a type such as a camera or a radar. Since each sensor has a detection characteristic, the sensor specification acquisition unit 23 acquires the sensor type and the sensor type can be used to calculate the sensable area in consideration of the characteristic of the sensor type.

Thereafter, the map information acquisition unit 24 acquires a road shape (gradient, curve curvature, merging, intersection, and the like) and feature information (building, tunnel, sign, and the like) of a destination planned by the host vehicle (map acquisition processing: step S14).

Then, the future position estimation unit 25 estimates the future position of the host vehicle with respect to the current position of the host vehicle based on the current position of the host vehicle and the vehicle behavior acquired by the host vehicle information acquisition unit 21 (host vehicle future position estimation processing: step S15).

In addition, the blind spot area calculation unit 26 calculates a sensable area at each future position of the host vehicle set in step S15 (step S16). Here, the blind spot area calculation unit 26 calculates a sensable area at a future position based on the surrounding environment information of the host vehicle acquired in step S12, the sensor specification information of the external recognition sensor mounted on the host vehicle acquired in step S13, and the road shape and feature information acquired in step S14.

Further, the blind spot area calculation unit 26 estimates the blind spot area at the future position using the sensable area at the future position calculated in step S16 (blind spot area calculation processing: step S17). Here, the blind spot area calculation unit 26 determines an area other than the sensable area as an area that cannot be sensed, and sets this area as a blind spot area. When estimating the blind spot area, the blind spot area calculation unit 26 estimates an appropriate blind spot area from a situation around a future position based on road information or the like. A specific example in which the blind spot area calculation unit 26 estimates an appropriate blind spot area from a surrounding situation such as a road at a future position will be described with reference to FIG. 5 and subsequent drawings.

Note that the sensable area information including the blind spot area information calculated by the blind spot area calculation unit 26 is temporarily stored as the sensable area calculation result information 32 of the storage unit 30. When the blind spot area calculation unit 26 estimates the blind spot area, information of the past blind spot area stored in the storage unit 30 may be referred to.

Then, the vehicle control value determination unit 27 reads the sensable area including the blind spot area information at each future time stored as the sensable area calculation result information 32, and sets the vehicle control value of the host vehicle based on the read sensable area (step S18). The vehicle control value of the host vehicle here is, for example, at least one of a target speed, a target acceleration, and a target lane change timing.

[Example of Determination of Sensable Area]

Figure 4:
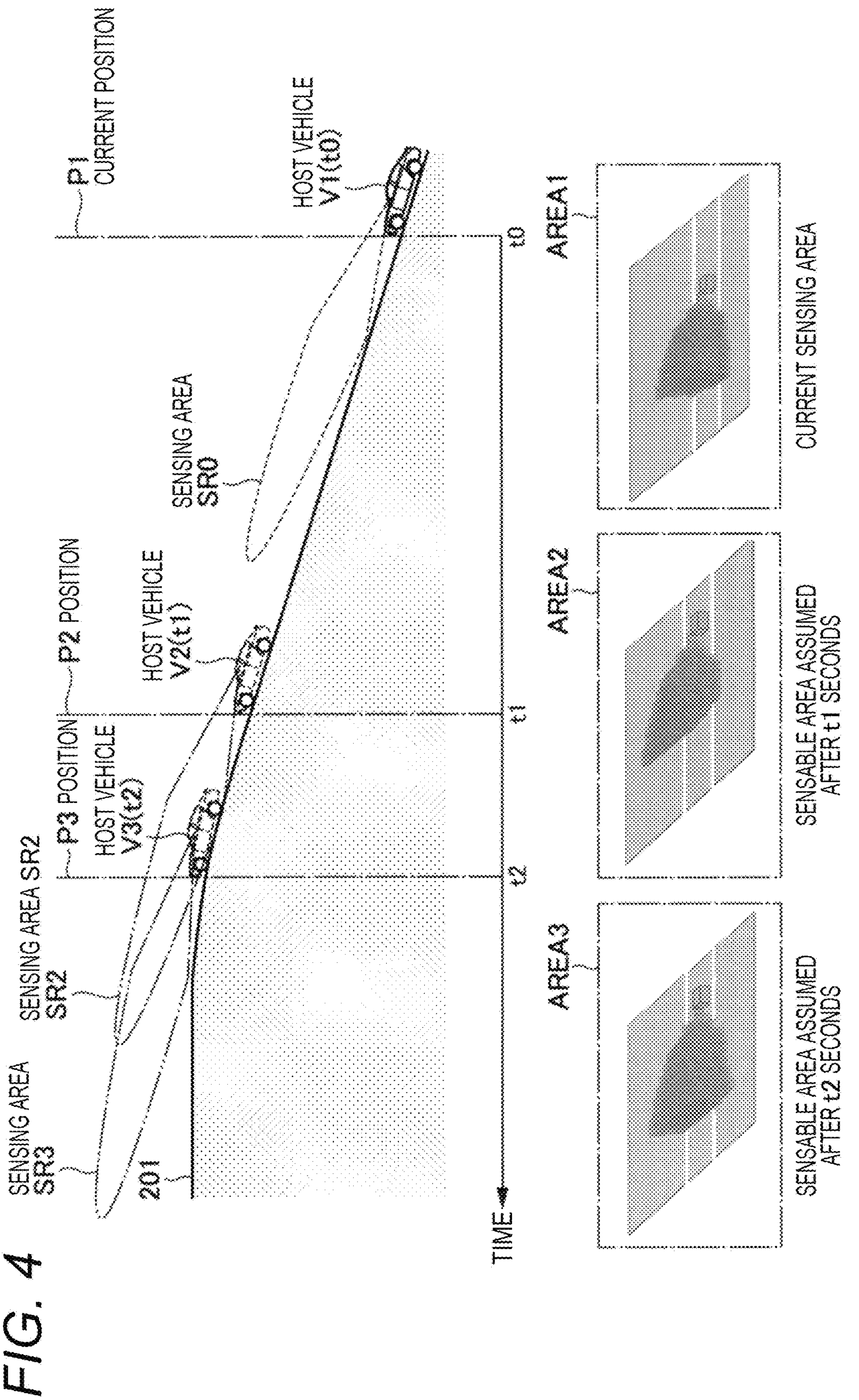
FIG. 4 is a diagram illustrating a concept of a sensable area according to the first embodiment of the present invention.

FIG. 4 illustrates an example of estimation of the future position of the host vehicle with respect to the current position of the host vehicle by the future position estimation unit 25 in step S15 and determination of the sensable area by the blind spot area calculation unit 26 in step S16 at the estimated future position.

The upper side of FIG. 4 illustrates traveling positions of the vehicle traveling on an uphill road 201 at the current time t0 and the future times t1 and t2. In addition, AREA1, AREA2, and AREA3 on the lower side of FIG. 4 illustrate examples of sensable areas SR0, SR1, and SR2 of the sensor at the respective times t0, t1, and t2 based on the vehicle horizontal reference.

For example, as illustrated in FIG. 4, the future position estimation unit 25 estimates positions P2 and P3 of host vehicles V2 and V3 at future times t1 and t2 with respect to the position P1 of the host vehicle V1 at the current t0.

Here, the future times t1 and t2 may be preset times with respect to the current time t0. Alternatively, the future times t1 and t2 may be times set according to information such as a speed, an acceleration, a traveling direction, a traveling lane, and a surrounding traffic environment of the host vehicle and surrounding objects.

In addition, the future times t1 and t2 may be set at any plurality of times, or may be set in advance at a certain fixed interval based on the current time t0. Note that, at the future times t1 and t2, the granularity of the set interval may be adjusted according to the weather and the road surface condition that can be acquired by an external recognition sensor or the like.

When determining the sensable area in the blind spot area calculation unit 26, the sensable range based on the sensor specification is obtained from the sensor specification information. Here, the sensable area converted into the vehicle horizontal reference is obtained based on road information and terrain information at each future time. For example, in a case where host vehicle V2 senses the vicinity of the top of the slope at future time t1 on the slope in FIG. 4, it can be seen that the vicinity of the ground cannot be sensed with respect to the traveling gradient of the vehicle as in sensing area available area AREA2.

Note that the shape of the sensable area may be calculated using the sensor type information in the calculation of the sensable area in the blind spot area calculation unit 26. Specifically, since the detection accuracy of the camera sensor decreases at night or in bad weather, it is possible to set the range of the sensable area to x %. Here, x may be set in advance, or may be set by determining the illuminance of the surrounding environment or the degree of bad weather.

[Control Example on Slope]

Next, a control example of the vehicle by the vehicle control device 1 of the present embodiment will be described with reference to FIGS. 5 to 8.

Figure 5:
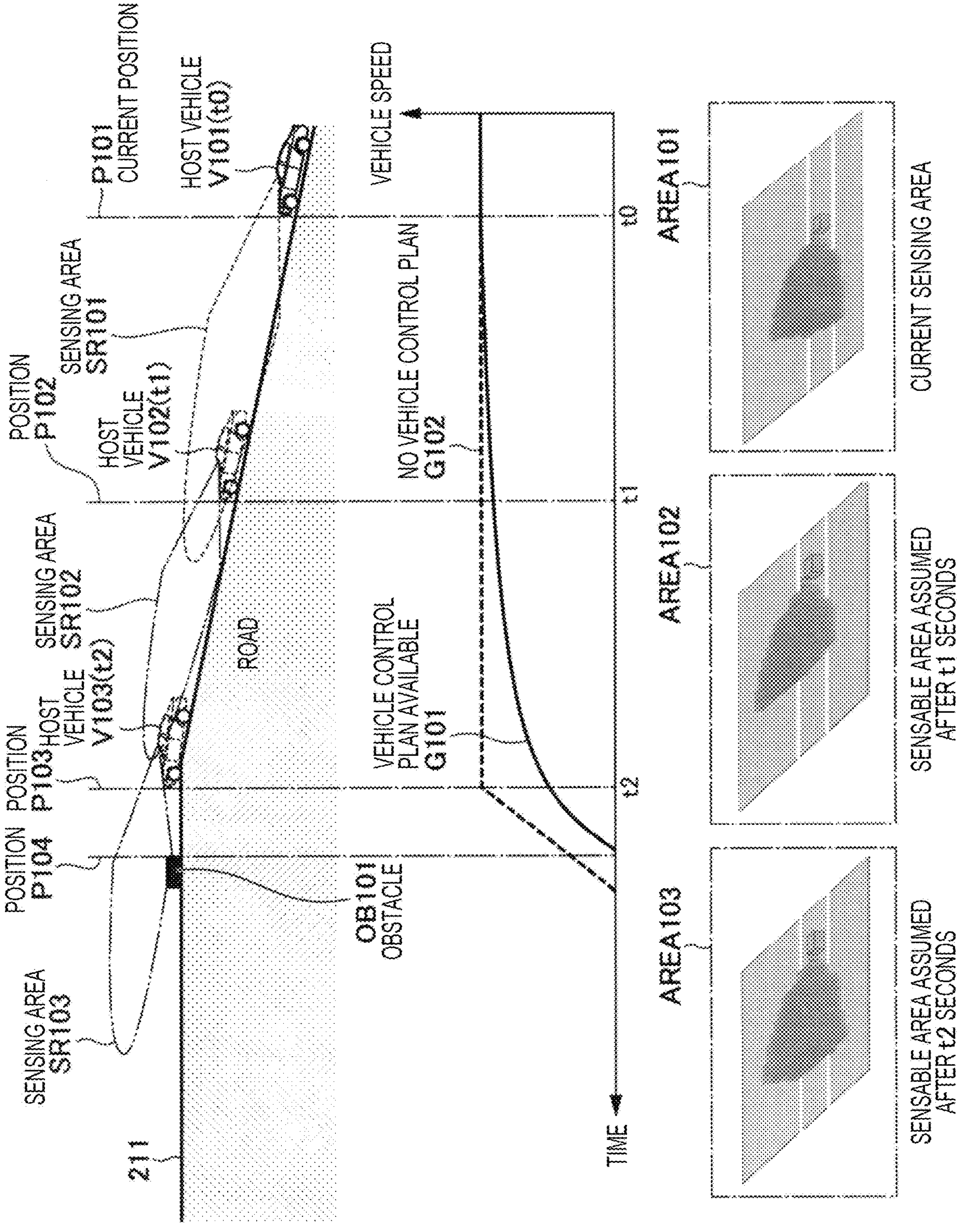
FIG. 5 is a diagram illustrating an example of vehicle control based on a sensable area on a slope according to the first embodiment of the present invention.

FIG. 5 illustrates an example in which vehicle control based on determination of a sensable area by the vehicle control device 1 of the present embodiment is applied when a host vehicle V101 is traveling on a slope. Note that, in FIG. 5, a scene in which an obstacle OB101 actually falls near the top of the slope will be described. The upper part of FIG. 5 is a cross-sectional view of a vehicle traveling on a sloping road 211. In addition, the middle part of FIG. 5 indicates the control value of the vehicle speed, and the lower part of FIG. 5 indicates the sensable area based on the vehicle horizontal reference at each position.

The host vehicle V101 represents a position P101 of the host vehicle at the current time t0. Host vehicles V102 and V103 are obtained by estimating positions P102 and P103 of the host vehicle at two future times t1 and t2 with respect to the host vehicle V101 at the current position.

Calculation of the sensable area at the positions P102 and P103 at the future times t1 and t2 of the host vehicle will be described.

First, the blind spot area calculation unit 26 calculates blind spot areas in the sensing areas SR102 and SR103 based on the sensor specifications. The sensing areas SR102 and SR103 illustrated in FIG. 5 are vertical planes when the road 211 is viewed in cross section, but the sensing areas SR102 and SR103 to be calculated have three-dimensional shapes.

Then, the blind spot area calculation unit 26 uses the gradient information of the road 211 to calculate sensable areas AREA102 and AREA103 based on the vehicle horizontal reference as illustrated in the lower part of FIG. 5.

For example, at the position P102 of the host vehicle at the future time t1, the host vehicle approaches the top of the road 211 that becomes a slope in a short time, but the ground near the top of the slope cannot be sufficiently sensed, so that it can be seen that it is a blind spot area.

It can be seen that the blind spot area exists near the ground at the top of the slope while host vehicle V101 is at the current position P101 using the calculation result of the assumed blind spot area. Therefore, the host vehicle V101 can smoothly limit the traveling speed. Then, since the host vehicle V101 reaches the top of the slope in a state where the traveling speed is limited (vehicle control plan available: G101), even if the obstacle OB101 is actually detected immediately before at the position P103, the possibility of avoiding the obstacle OB101 by the autonomous emergency braking (hereinafter, referred to as AEB) or the avoiding emergency steering avoidance (hereinafter, referred to as AES) can be sufficiently increased.

Specifically, as illustrated in the middle part of FIG. 5, when the control value of the vehicle speed (upper limit value of the vehicle speed) output by the vehicle control device 1 of the present example is indicated, a vehicle speed control value G101 obtained at time t0 in the case of performing the control process of the present example gradually decreases at positions P102 and P103 (times t1 and t2), and a process of changing the upper limit speed in the section of the coming position as compared with a vehicle speed control value G102 having no vehicle control plan is performed. Therefore, when the obstacle OB101 is detected at the immediately preceding position P103, the host vehicle V101 can safely stop.

On the other hand, when the vehicle control process of the present example is not performed, that is, the vehicle speed control value G102 having no vehicle control plan continues to travel at the maximum speed until the time t2 at which the vehicle reaches the top of the slope. Therefore, even if the obstacle OB101 is detected, depending on the speed, a situation that is difficult for the host vehicle V101 to avoid using AEB or AES occurs.

Note that, as the control by the vehicle control device, there is a control in which it is known from map information or the like that the host vehicle is traveling on a slope, and the traveling speed of the host vehicle is reduced in advance when the host vehicle approaches the vicinity of the top. However, when such control is performed, in a case where the gradient degree of the slope is gentle, unnecessary deceleration that is uncomfortable for the occupant may occur.

Therefore, in the vehicle control device 1 of the present example, since it is possible to know whether or not sensing of the vicinity of the ground is performed satisfactorily by performing control in consideration of the sensor specifications (sensing distance, horizontal/vertical view angle) of the host vehicle, it is possible to perform suitable vehicle control by determining a scene where deceleration is necessary and a scene where deceleration is unnecessary.

Furthermore, the vehicle control device 1 of the present example specifies a sensable area at a future point of time. As a result, it is possible to perform safe and comfortable vehicle control even for a scene in which safe and comfortable vehicle control cannot be performed only with the current sensing information of the host vehicle.

For example, if the sensing distance of the sensor mounted on the host vehicle is short, the number of "sudden" movements increases. In the scene illustrated in FIG. 5, even if the host vehicle actually approaches the vicinity of the top of the slope and detects a blind spot area in the vicinity of the ground, the host vehicle may cause unsmooth, jerky deceleration, which may cause discomfort to the occupant.

On the other hand, in the case of the vehicle control device 1 of the present example, by specifying the sensable area sufficiently in advance, it is possible to obtain a large effect of reducing the discomfort while securing the safety of the occupant.

[Control Example in Merging Scene]

Figure 6:
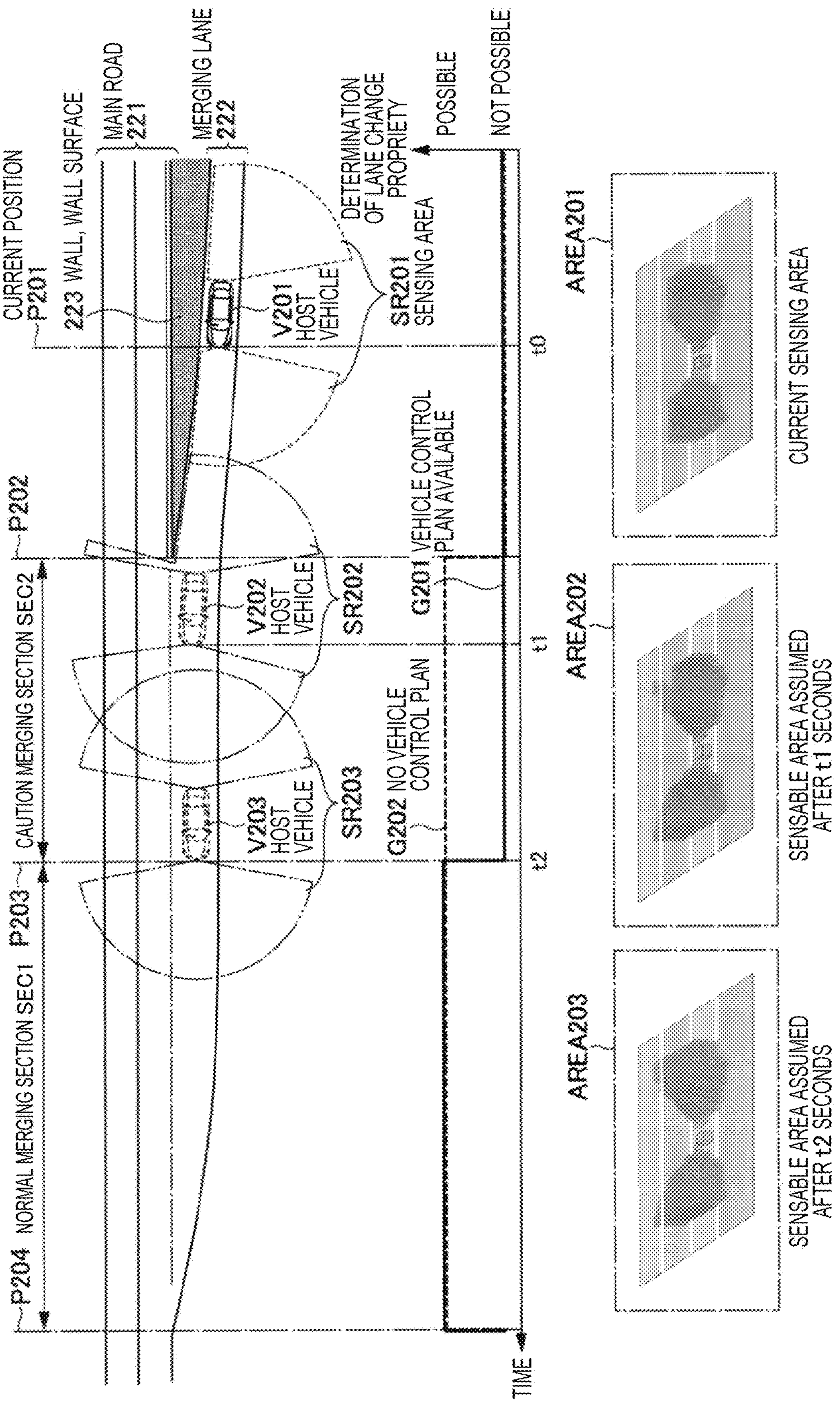
FIG. 6 is a diagram illustrating an example of vehicle control based on a sensable area at merging according to the first embodiment of the present invention.

FIG. 6 illustrates an example of the vehicle control based on the sensable area detection obtained by the vehicle control device 1 of the present example when a host vehicle V201 is traveling on the merging road to the main line. The upper part of FIG. 6 is a top view of the vehicle traveling on a merging road 222 to the main road 221, and the middle part of FIG. 6 indicates the control value of the vehicle speed. In addition, the lower part of FIG. 6 illustrates a sensable area based on the vehicle horizontal reference at each position. In the case of the example of FIG. 6, in order to sense another vehicle approaching from the side behind the vehicle, sensing is also performed by a sensor behind the vehicle.

The host vehicle V201 represents the current position P201 of the host vehicle. The current position P201 of the host vehicle is on the way of the merging road 222 which joins the main road 221 in front. Host vehicles V202 and V203 are obtained by estimating host vehicles at positions P202 and P203 of the host vehicle at future times t1 and t2 with respect to the host vehicle V201 at the current position. The position P202 is a start position of a merging point that starts running in parallel with the main road 221, and the position P203 indicates a middle of the merging point running in parallel with the main road 221.

Next, an operation example of the sensable area at the positions P202 and P203 at the future times t1 and t2 of the host vehicle will be described.

First, the vehicle control device 1 calculates sensable areas in the sensing areas SR202 and SR203 based on the sensor specification information. For example, the vehicle control device 1 calculates sensable areas AREA202 and AREA203 based on vehicle horizontal reference as illustrated in the lower part of FIG. 6 using road gradient information and features (tunnel or wall).

The host vehicle V201 at the current position P201 is traveling on the merging road 222 toward merging. The merging road 222 and the main line 221 on which the host vehicle travels are shielded by walls, and the host vehicle V201 cannot sense the main line 221 side at all.

In the example of FIG. 6, a case has been described on the premise of a scene where the road is shielded by the tunnel wall immediately before the merging section such as an urban expressway. On the other hand, also in a case where the connection between the merging road 222 and the main road 221 is a slope from a low land to a high land or vice versa, the processing of the present embodiment can be similarly applied.

Referring to FIG. 6, it can be seen that the sensing area SR202 at the position P202 of the host vehicle at the future time t1 is good on the front side, and is partially missing on the rear side due to the walls of the main road and the merging road. Further, it can be seen that the sensing area is good on both the front side and the rear side in the sensable area SR203 at the position P203 of the host vehicle at the future time t2.

Therefore, the vehicle control device 1 can determine that optimal timing for the host vehicle V201 to merge with the main road 221 is after the position P203, and can plan the lane change propriety determination. That is, as illustrated in the middle part of FIG. 6, the vehicle control device 1 outputs the vehicle speed control value G201 with a vehicle control plan.

The vehicle control device 1 recognizes that there is a blind spot area on the main road side at the merging while the host vehicle V201 is at the current position P201 using the calculation result of the assumed blind spot area. Therefore, the lane change is not permitted in a situation where there is a blind spot area, and the lane change timing and the traveling speed can be smoothly limited.

On the other hand, with the vehicle speed control value G202 when the process of the present embodiment is not applied, the lane change can be made from the point P202. Here, if a lane change is performed while another vehicle is present in the blind spot area on the main road 221 side, the other vehicle suddenly appears in the sensable area, and vehicle control such as sudden deceleration or sudden returning of steering is performed. This may cause anxiety and discomfort to the occupant.

As described above, by applying the processing of the present embodiment, the vehicle control device 1 can perform control such that the lane change is performed under the most favorable sensing condition for the host vehicle. In addition, since the vehicle control device 1 can take time to detect the vehicle on the main line 221 side while traveling in the caution merging section SEC2 and can change the lane in the normal merging section SEC1, it is possible to reduce a collision scene with another vehicle.

[Control Example in Case Where Preceding Vehicle Exists on Slope]

Figure 7:
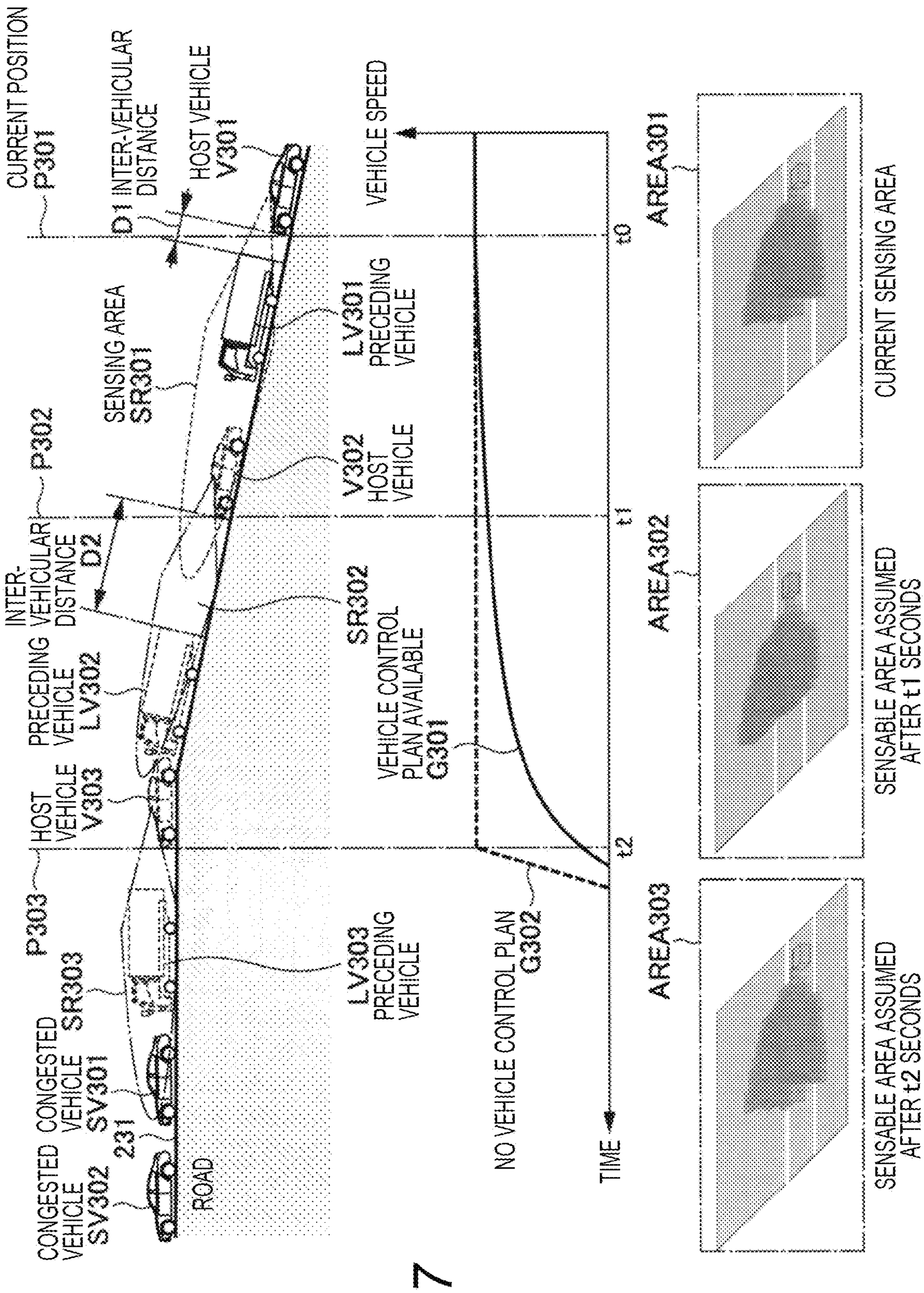
FIG. 7 is a diagram illustrating an example of vehicle control based on a sensable area in a case where a preceding vehicle is present on a slope according to the first embodiment of the present invention.

FIG. 7 illustrates an example in which the vehicle control based on the sensable area in the present embodiment is applied in a case where a preceding vehicle LV301 exists in front of a host vehicle V301.

The upper part of FIG. 7 is a cross-sectional view of a vehicle traveling on a sloping road 231, and the middle part of FIG. 7 indicates a control value of the vehicle speed. In addition, the lower part of FIG. 7 illustrates a sensable area based on the vehicle horizontal reference at each position.

The host vehicle V301 indicates a current position P301 of the host vehicle. At this time, a preceding vehicle LV301 exists in front of the host vehicle V301, and the host vehicle V301 travels while maintaining an inter-vehicular distance D1 from the preceding vehicle LV301.

Host vehicles V302 and V303 are obtained by estimating positions P302 and P303 of the host vehicle at two future times t1 and t2 with respect to the host vehicle V301 at the current position.

The vehicle control device 1 of the host vehicle V301 detects the relative position and the relative speed of the preceding vehicle LV301 by the external recognition sensor, and predicts positions LV302 and LV303 where the preceding vehicle LV301 exists at the future times t1 and t2.

Calculation of the sensable area at each of the positions P302 and P303 at each of the future times t1 and t2 of the host vehicle will be described. First, the vehicle control device 1 calculates sensing areas SR302 and SR303 based on the sensor specification information. Then, the vehicle control device 1 calculates the sensable areas AREA302 and AREA303 based on the vehicle horizontal reference using the road gradient information and the position and size of the preceding vehicle detected by the external recognition sensor. At this time, by treating a sensable area missing by the preceding vehicles LV302 and LV303 as a preceding vehicle blind spot area, the vehicle control device 1 can perform vehicle control by distinguishing between a blind spot area due to a normal road gradient or feature and a blind spot area due to a moving object.

At the position P302 of the host vehicle at the future time t1, the host vehicle will soon reach the vicinity of the top, but since the preceding vehicle LV302 is present, the vicinity of the top of the slope cannot be sufficiently sensed. Therefore, the vehicle control device 1 predicts that the position P302 of the host vehicle at the future time t1 becomes the blind spot area.

Furthermore, it is also assumed that the preceding vehicle LV302 at the future time t1 suddenly brakes to avoid collision with the congested vehicle SV301 at the top of a slope, and it is not preferable that the host vehicle is traveling with the current inter-vehicular distance D1.

Therefore, at the future time t1, the vehicle control device 1 performs vehicle control for generating a vehicle speed control value G301 with a vehicle control plan for reducing the traveling speed so that an inter-vehicular distance D2 with the preceding vehicle LV302 is wider than the inter-vehicular distance D1 at the current position.

When the present embodiment is not applied, the vehicle speed control value G102 having no vehicle control plan is obtained. In the case of the vehicle speed control value G102, in the example of FIG. 7, when the preceding vehicle LV301 approaches the vicinity of the slope top, the preceding vehicle (LV302 or LV303) notices the congested vehicles SV301 and SV302, decelerates, and stops. At this time, when the host vehicle travels while maintaining a constant inter-vehicular distance from the preceding vehicle by ACC or automatic driving, AEB or AES is activated, which causes anxiety or discomfort to the occupant.

Note that, as illustrated in FIG. 7, when a preceding vehicle is detected and the blind spot area calculation unit 26 calculates a blind spot area, size information of the preceding vehicle which is a moving object present around the host vehicle may be acquired, and the blind spot area calculation unit 26 may calculate an appropriate blind spot area based on the behavior of the moving object. In addition, in addition to the case where there is a preceding vehicle, also in the merging scene as illustrated in FIG. 6, the size information of the vehicle on the main line side may be acquired, and the blind spot area calculation unit 26 may calculate an appropriate blind spot area based on the behavior of the moving object.

This makes it possible to more accurately calculate the blind spot area.

[Control Example in Case of Traffic Congestion after Curve]

Figure 8:
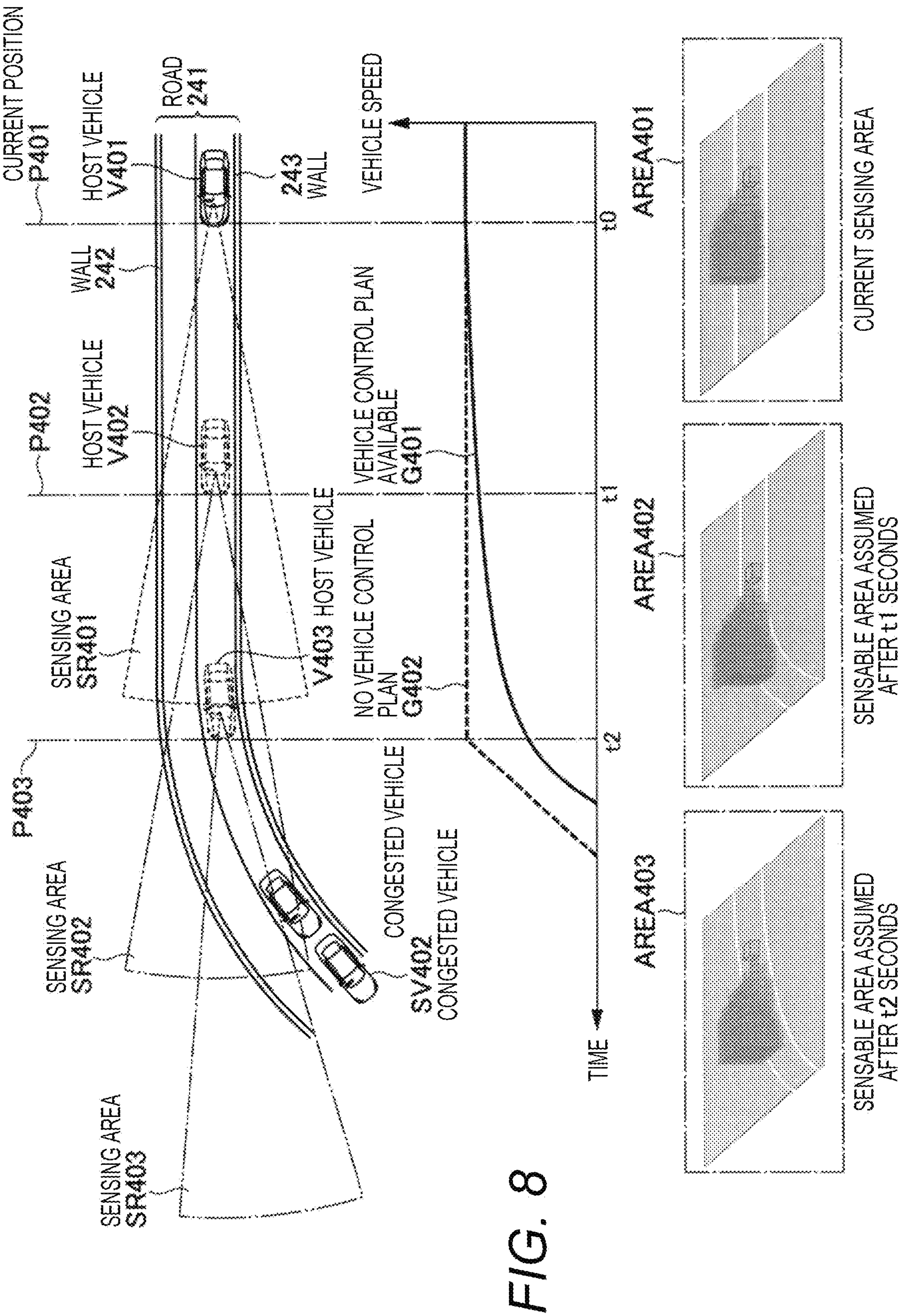
FIG. 8 is a diagram illustrating an example of vehicle control based on a sensable area in a curve with poor visibility according to the first embodiment of the present invention.

FIG. 8 illustrates an example in which the vehicle control device 1 according to the present embodiment performs vehicle control based on a sensable area on a curved road 241 surrounded by a wall surface such as an urban expressway. In FIG. 8, a scene in which a traffic congestion occurs after the curve will be described. The upper part of FIG. 8 is a top view of a vehicle traveling immediately before entering a curved portion of the road 241. The middle part of FIG. 8 indicates the control value of the vehicle speed, and the lower part of FIG. 8 indicates the sensable area based on the vehicle horizontal reference at each position.

The position of a host vehicle V401 indicates a current position P401 of the host vehicle. Host vehicles V402 and V403 are obtained by estimating positions P402 and P403 of the host vehicle at the future times t1 and t2 with respect to the host vehicle V401 at the current position.

Calculation of the sensable area at the positions P402 and P403 at the future times t1 and t2 of the host vehicle will be described. First, the vehicle control device 1 calculates blind spot areas in the sensing areas SR402 and SR403 based on the sensor specifications. That is, as illustrated in the lower part of FIG. 8, the vehicle control device 1 uses the road gradient information and the feature information (tunnel or wall surface) to calculate sensable areas AREA402 and AREA403 based on the vehicle horizontal reference at each of the positions P402 and P403. Note that, as the feature information (tunnel, wall surface, or the like), a result detected by the external recognition sensor may be used.

It can be seen that the sensable area AREA402 at the position P402 of the host vehicle at the future time t1 is a blind spot area because the host vehicle will soon reach a curve but cannot sufficiently sense the curve ahead.

It can be seen that the blind spot area exists ahead of the curve when the host vehicle V401 approaches the curve while staying at the current position P401 using the calculation result of the assumed blind spot area. Thus, the host vehicle V401 can smoothly limit the traveling speed. Then, the vehicle control device 1 generates a speed control value G401 with a vehicle control plan that decreases the speed as approaching the curve. As a result, since the host vehicle approaches the curve in a state where the traveling speed is limited, even if a last vehicle SV401 in the congested line of vehicles is actually detected immediately before at the position P403, the possibility that the last vehicle can be avoided by AEB or AES can be sufficiently increased.

When the present embodiment is not applied, the host vehicle actually approaches the curve, and a speed control value G402 having no vehicle control plan for traveling at the maximum speed is generated until the last vehicle SV401 in the congested line of vehicles is detected. For this reason, when the speed control value G402 is used for control, an emergency braking operation is required, which is not preferable.

In addition, even in a case where the present embodiment is not applied, there is a case where it is known from map information or the like that the host vehicle travels on a curve, and control is performed such that the traveling speed of the host vehicle is decreased in advance when the host vehicle approaches the curve. However, this control is different from the control of the present embodiment. That is, there is a possibility that the conventional velocity control in the curve cannot be appropriately controlled with respect to a case such as a congested line of vehicles or a falling object after the curve depending on the curvature of the curve and the presence or absence of the wall surface.

On the other hand, in the vehicle control device 1 of the present embodiment, it is possible to know whether or not the sensable area ahead of the curve is good by considering the sensor specifications (sensing distance, horizontal/vertical view angle) of the host vehicle. Therefore, it is possible to determine a scene where deceleration is necessary and a scene where deceleration is unnecessary and perform suitable vehicle control.

As described above in the travel examples in various scenes, the vehicle control device 1 according to the present embodiment specifies a sensable area at a future point of time. As a result, according to the vehicle control device 1 of the present embodiment, it is possible to perform safer and more comfortable vehicle control than before even for a scene in which safe and comfortable vehicle control cannot be performed using only current sensing information of the host vehicle.

That is, vehicle control for avoiding a dangerous scene can be planned sufficiently in advance. For example, in a merging scene, it is possible to specify a sensable area at a future point of time at a stage of traveling on a merging road, and to set a timing at which the vehicle can smoothly change the lane to the main line (a point of time at which there is no blind spot area for sensing on the main line side).

In addition, specifying the sensable area at a future point of time for the host vehicle is not limited to the above-described merging scene, and it is possible to set a vehicle control plan so as to be able to reduce and avoid in advance a dangerous scene assumed to have many potential risks with many blind spot areas such as a winding mountain pass with steep up-and-downs that makes it difficult to see the situation ahead and a multistory parking lot with a spiral slope.

Second Embodiment

Figure 9:
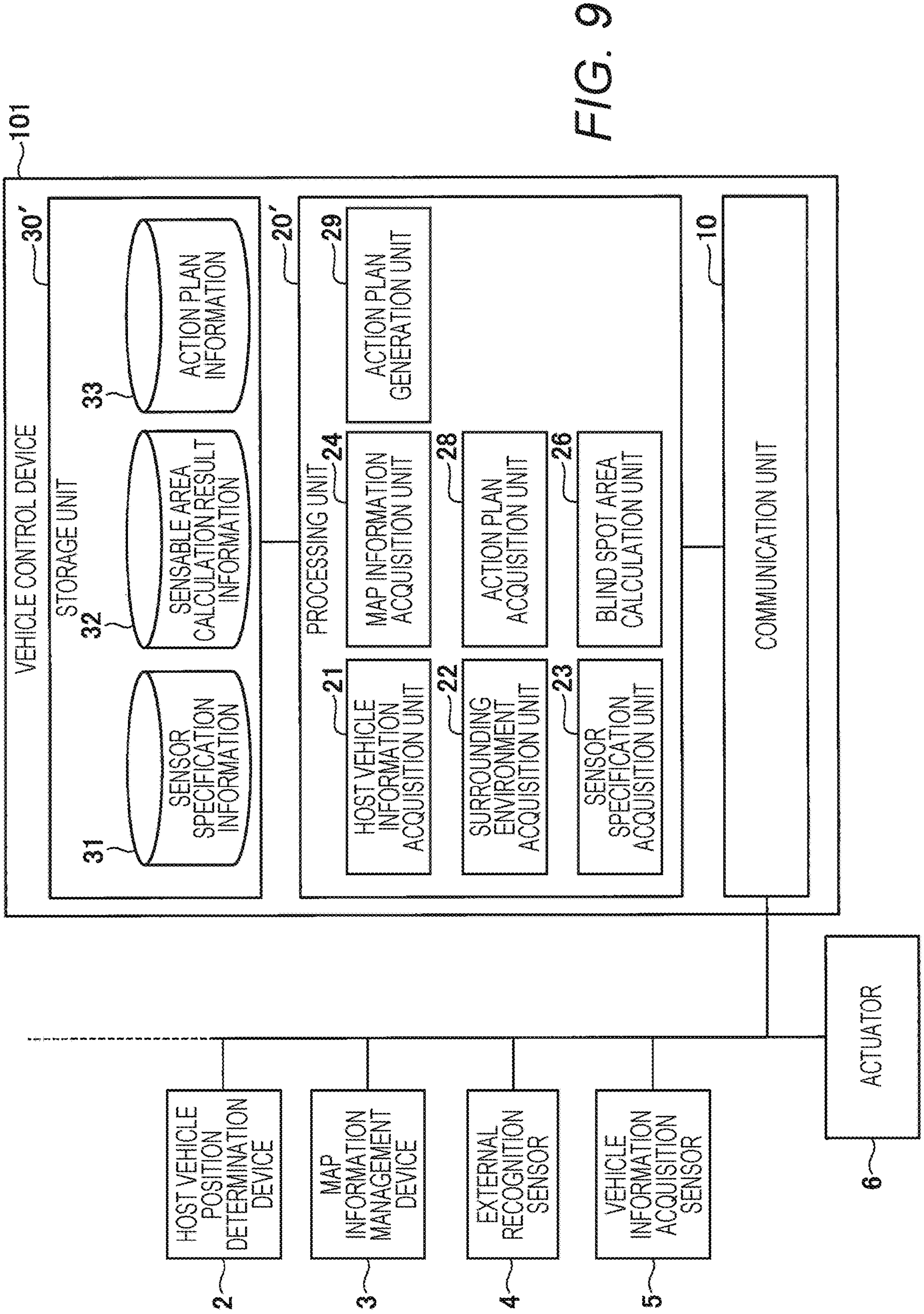
FIG. 9 is a block diagram illustrating a vehicle control device according to a second embodiment of the present invention and a peripheral configuration thereof.
Figure 10:
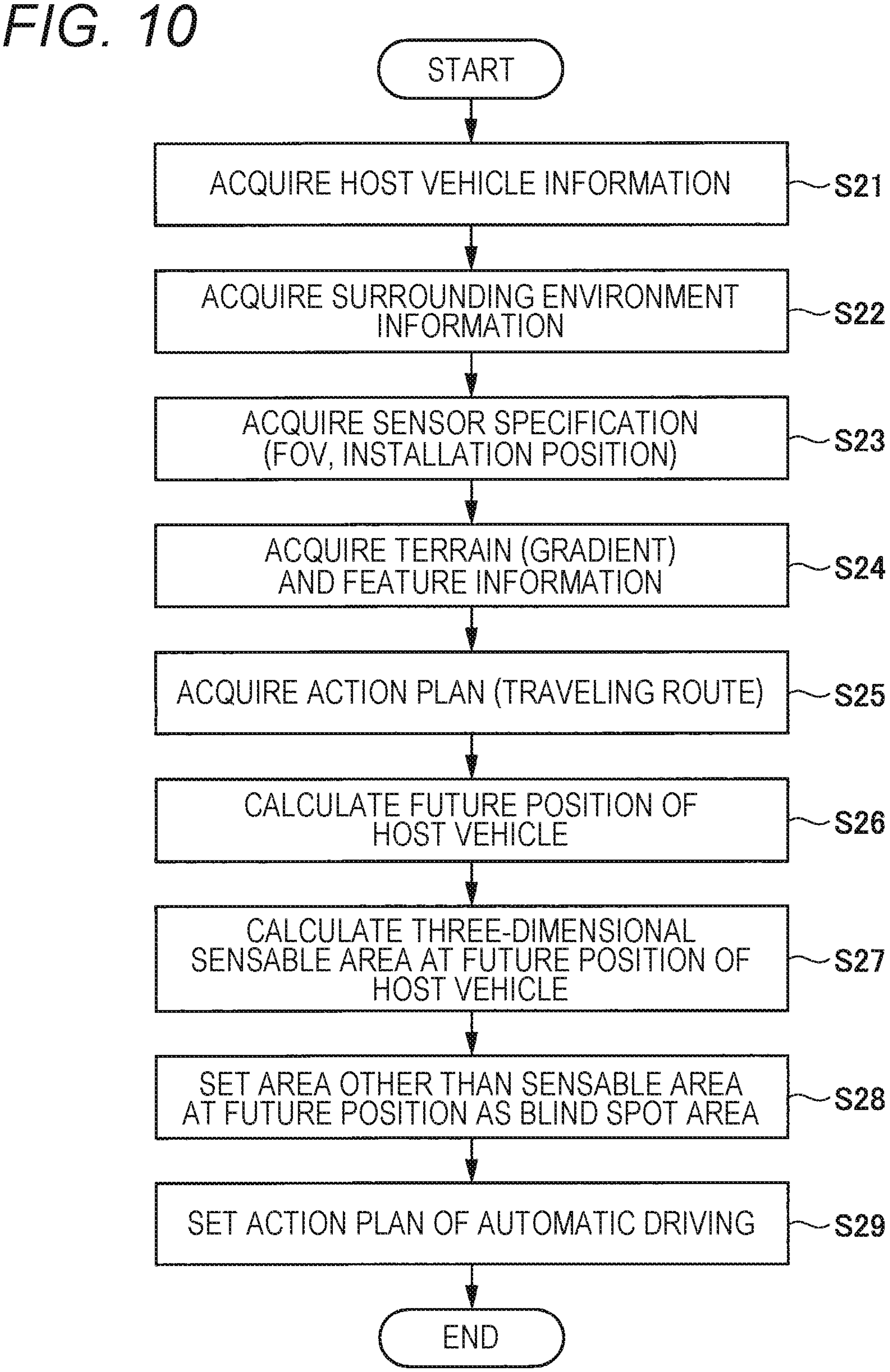
FIG. 10 is a flowchart illustrating an example of control processing by the vehicle control device according to the second embodiment of the present invention.

Next, a second embodiment of the present invention will be described with reference to FIGS. 9 to 10. In FIGS. 9 to 10, the same portions as those in FIGS. 1 to 8 described in the first embodiment are denoted by the same reference numerals, and redundant description is omitted.

In the present embodiment, a vehicle control device 101 is applied to a control device for an automatic driving system of a vehicle. Here, the automatic driving system means that the vehicle control device 101 of the host vehicle is responsible for all the driving operations performed by the driver at the normal time.

[Configuration of Vehicle Control Device]

FIG. 9 illustrates a configuration example of the vehicle control device 101 according to the present embodiment. The basic configuration of the vehicle control device 101 is the same as that of the vehicle control device 1 illustrated in FIG. 1 in the first embodiment, and is also the same in that it is configured by a computer as illustrated in FIG. 2.

The vehicle control device 101 illustrated in FIG. 9 is different from the processing unit 20 of the vehicle control device 1 illustrated in FIG. 1 in that an action plan for automatic driving control is generated in a processing unit 20'. In addition to the sensor specification information 31 for calculating the sensable area and the sensable area calculation result information 32 which is a calculation result of the calculated sensable area, the storage unit 30' stores action plan information 33 which is a result of calculating the action plan.

The processing unit 20' includes a host vehicle information acquisition unit 21, a surrounding environment acquisition unit 22, a sensor specification acquisition unit 23, a map information acquisition unit 24, a blind spot area calculation unit 26, an action plan acquisition unit 28, and an action plan generation unit 29.

The host vehicle information acquisition unit 21, the surrounding environment acquisition unit 22, the sensor specification acquisition unit 23, the map information acquisition unit 24, and the blind spot area calculation unit 26 have the same configuration as that of the processing unit 20 of the vehicle control device 1 described in FIG. 1.

A difference from the vehicle control device illustrated in FIG. 1 is that, when the blind spot area calculation unit 26 calculates a blind spot area, a blind spot area on a route on which the host vehicle travels in the future is calculated based on a past action plan acquired by an action plan acquisition unit 28 described below.

The action plan acquisition unit 28 acquires a past action plan.

The action plan generation unit 29 generates an action plan for autonomous driving of the host vehicle based on the sensable area including the blind spot area information calculated by the blind spot area calculation unit 26.

Other configurations of the vehicle control device 101 are the same as those of the vehicle control device 1 illustrated in FIG. 1, and thus overlapping description is omitted.

[Control Processing by Vehicle Control Device]

FIG. 10 is a flowchart illustrating vehicle control processing by the vehicle control device 101 according to the present embodiment.

First, the host vehicle information acquisition unit 21 acquires the vehicle behavior at the current position of the host vehicle in association with the current host vehicle position information specified by the host vehicle position determination device 2 and the behavior information of the host vehicle such as the speed, the acceleration, and the yaw rate that can be acquired by the vehicle information acquisition sensor 5 (step S21).

In addition, the surrounding environment acquisition unit 22 acquires information such as the position or movement of a surrounding object (vehicle, pedestrian, bicycle, motorcycle, and the like), weather, and road surface condition that obstruct the travel of the host vehicle from the result detected by the external recognition sensor 4 (step S22).

Further, the sensor specification acquisition unit 23 reads specification information (installation position, maximum sensing distance, horizontal/vertical viewing angle, and sensor type) of the external recognition sensor mounted on the host vehicle stored as the sensor specification information 31 of the storage unit 30' (step S23). Here, the sensor type is a type of a camera, a radar, or the like, and each sensor has a detection characteristic, and can be used for calculation of a sensable area in consideration of the characteristic of the sensor.

Then, the map information acquisition unit 24 acquires a road shape (gradient, curve curvature, merging, intersection, and the like) and feature information (building, tunnel, sign, and the like) of a traveling destination scheduled by the host vehicle (step S24).

Furthermore, the action plan acquisition unit 28 acquires the action plan information 33 for autonomous driving calculated in the past, stored in the storage unit 30' (step S25).

Furthermore, the action plan acquisition unit 28 extracts a position where the host vehicle travels in the future based on the action plan (travel route) acquired from the action plan information 33, thereby specifying the future position of the host vehicle with respect to the current position of the host vehicle (step S26). For example, as illustrated in FIG. 4, the positions P2 and P3 of the host vehicles V2 and V3 at the future times t1 and t2 with respect to the position P1 of the host vehicle at the current to are estimated.

Here, similarly to the first embodiment, the future times t1 and t2 may be preset times with respect to the current time t0, or may be times set according to information such as a speed, an acceleration, a traveling direction, a traveling lane, and a surrounding traffic environment of the host vehicle and the surrounding objects.

The future time may be set at any plurality of times, but may be set in advance at a time of a certain fixed interval based on the current time t0. Note that the granularity of the setting interval may be adjusted according to the weather and the road surface condition that can be acquired by an external recognition sensor or the like.

Then, the blind spot area calculation unit 26 calculates a sensable area at each future position of the host vehicle set in step S25 based on the surrounding environment information of the host vehicle acquired in step S22, the sensor specification information of the external recognition sensor mounted on the host vehicle acquired in step S23, and the road shape and feature information acquired in step S24 (step S27).

The sensable area calculated here is obtained from the sensor specification information based on the sensor specification. That is, the blind spot area calculation unit 26 obtains a sensable area converted into a vehicle horizontal reference based on road information and terrain information at each future time.

For example, in a case where host vehicle V2 senses the vicinity of the top of the slope at future time t1 on the slope illustrated in FIG. 4, it can be seen that the vicinity of the ground cannot be sensed with respect to the traveling gradient of the vehicle as in sensing area available area AREA2.

Furthermore, in the calculation of the sensable area, the shape of the sensable area may be calculated using the sensor type information. Specifically, since the detection accuracy of the camera sensor decreases at night or in bad weather, it is possible to set the range of the sensable area to x %. x may be set in advance, or may be set by determining the illuminance of the surrounding environment or the degree of bad weather.

Then, the blind spot area calculation unit 26 estimates the blind spot area at the future position using the sensable area at the future position calculated in step S27 (step S28). Here, the blind spot area calculation unit 26 determines and sets an area other than the sensable area as a blind spot area that cannot be sensed.

Here, the sensable area information including the blind spot area information calculated by the blind spot area calculation unit 26 is temporarily stored as the sensable area calculation result information 32 of the storage unit 30'.

Furthermore, the action plan generation unit 29 reads the sensable area including the blind spot area information at each future time stored as the sensable area calculation result information 32, and generates an action plan (including traveling route, traveling speed plan, and the like) for autonomous driving of the host vehicle based on the read sensable area (step S29).

The action plan generated by the action plan generation unit 29 is stored as action plan information 33 of the storage unit 30' for the sensable area calculation in the next step.

The vehicle control device 101 according to the present embodiment described above can also specify a sensable area at a future point of time. Therefore, even in the case of constructing the automatic driving system, it is possible to perform safe and comfortable automatic driving control even for a scene where safe and comfortable vehicle control cannot be performed only with the current sensing information of the host vehicle.

Note that, as a specific example in which safe and comfortable automatic driving control can be performed, similar to FIGS. 5 to 8 described in the first embodiment, the present invention can be applied to various scenes such as a slope, a merging scene, a slope with a preceding vehicle, and a traffic congestion scene after a curve.

Furthermore, even in a case where this automatic driving control is performed, as illustrated in FIG. 7, when a preceding vehicle is detected and the blind spot area calculation unit 26 calculates a blind spot area, size information of the preceding vehicle which is a moving object present around the host vehicle may be acquired, and the blind spot area calculation unit 26 may calculate an appropriate blind spot area based on the behavior of the moving object. In addition, in addition to the case where there is a preceding vehicle, also in the merging scene as illustrated in FIG. 6, the size information of the vehicle on the main line side may be acquired, and the blind spot area calculation unit 26 may calculate an appropriate blind spot area based on the behavior of the moving object.

As a result, even when the automatic driving control is performed, the calculation of the blind spot area can be performed more accurately.

<Modification>

Note that the present invention is not limited to the above-described embodiments, and includes various modifications. For example, the above-described embodiments have been described in detail in order to describe the present invention in an easily understandable manner, and are not necessarily limited to those having all the described configurations.

For example, in each of the above-described embodiments, the control of the traveling speed, the inter-vehicular distance, and the timing of lane change is applied to the case by specifying a sensable area at a future point of time. On the other hand, by specifying the sensable area at the future point of time, the sensable area may be used for controlling the physical quantity related to the riding comfort of the steering wheel or the suspension. As a result, it is possible to improve the comfort of the occupant in the vehicle.

In addition, in the configuration illustrated in FIG. 2, the vehicle control device is configured by a computer executed by the control of the CPU, but a part or all of the functions performed by the vehicle control device may be realized by dedicated hardware such as a field programmable gate array (FPGA) or an application specific integrated circuit (ASIC).

In addition, in the block diagrams of FIGS. 1, 2, and 9, only control lines and information lines considered to be necessary for description are illustrated, and signal lines and information lines necessary for a product are not necessarily illustrated. In practice, it may be considered that almost all the configurations are connected to each other.

Furthermore, the order of the processing illustrated in the flowcharts illustrated in FIGS. 3 and 10 is also an example, and the order of the processing may be changed within a range not affecting the processing result, or a plurality of processing may be simultaneously executed.

In addition, information such as programs, tables, and files that implement functions performed by the vehicle control device can be stored in various recording media such as a memory, a hard disk, a solid state drive (SSD), an IC card, an SD card, and an optical disk.

REFERENCE SIGNS LIST

1 vehicle control device
1*a* CPU
1*b* ROM
1*c* RAM
1*d* nonvolatile storage
1*e* network interface
1*f* input device
1*g* output device
2 host vehicle position determination device
3 map information management device
4 external recognition sensor
5 vehicle information acquisition sensor
6 actuator
10 communication unit
20, 20' processing unit
21 host vehicle information acquisition unit
22 surrounding environment acquisition unit
23 sensor specification acquisition unit
24 map information acquisition unit
25 future position estimation unit
26 blind spot area calculation unit
27 vehicle control value determination unit
28 action plan acquisition unit
29 action plan generation unit
30, 30' storage unit
31 sensor specification information
32 sensable area calculation result information
33 action plan information
101 vehicle control device

The invention claimed is:

1. A vehicle control device comprising:
a map information acquisition unit configured to acquire a three-dimensional map in which three-dimensional position information of at least one of a feature and a road is set;
a host vehicle information acquisition unit that acquires a current position of a host vehicle;
a future position estimation unit that estimates a future position of the host vehicle at a future time based on the current position of the host vehicle;
a blind spot area calculation unit that obtains a blind spot area shielded by at least one of a feature or a road in a detection area of an external recognition sensor at the future time based on the three-dimensional map, the future position of the host vehicle, and sensor specification information indicating specifications of at least one external recognition sensor mounted on the host vehicle, wherein the sensor specification information is stored in a memory; and
a vehicle control value determination unit that determines a current control value of the host vehicle based on the blind spot area at the future time obtained by the blind spot area calculation unit.

2. The vehicle control device according to claim 1, wherein the vehicle control value determination unit changes an upper limit speed in a section from the current position to the future position when the blind spot area exists in front of the future position of the host vehicle in a traveling direction of the host vehicle.

3. The vehicle control device according to claim 1, wherein the vehicle control value determination unit does not permit a lane change to an adjacent lane in a section from the current position to the future position when a range of the blind spot area on the adjacent lane to which the lane change of the host vehicle will be made at the future position of the host vehicle is equal to or less than a threshold.

4. The vehicle control device according to claim 1, further comprising a blind spot area calculation unit that obtains a blind spot area shielded by a moving object present around the host vehicle at a future time based on size information of the moving object detected by the external recognition sensor and a behavior of the moving object.

5. A vehicle control device comprising:

an action plan generation unit that generates an action plan for autonomous driving of a host vehicle;

a map information acquisition unit configured to acquire a three-dimensional map in which three-dimensional position information of at least one of a feature and a road is set;

a host vehicle information acquisition unit that acquires a current position of a host vehicle;

a future position estimation unit that estimates a future position of the host vehicle at a future time based on the action plan and the current position of the host vehicle; and a blind spot area calculation unit that obtains a blind spot area shielded by at least one of a feature or a road in a detection area of an external recognition sensor at the future time based on the three-dimensional map, the future position of the host vehicle, and sensor specification information indicating specifications of at least one external recognition sensor mounted on the host vehicle, wherein the action plan generation unit generates the current action plan based on the blind spot area at the future time obtained by the blind spot area calculation unit.

6. The vehicle control device according to claim 5, further comprising a blind spot area calculation unit that obtains a blind spot area shielded by a moving object present around the host vehicle at a future time based on size information of the moving object detected by the external recognition sensor and a behavior of the moving object.

7. A vehicle control method for controlling a vehicle using calculation processing by an information processing device, the method comprising:

as the calculation processing by the information processing device, a map acquisition process of acquiring a three-dimensional map in which three-dimensional position information of at least one of a feature and a road is set;

a host vehicle information acquisition process of acquiring a current position and a speed of a host vehicle;

a future position estimation process of estimating a future position of the host vehicle at a future time based on the current position and the speed of the host vehicle; and a blind spot area calculation process of obtaining a blind spot area shielded by at least one of a feature or a road in a detection area of an external recognition sensor at the future time based on the three-dimensional map, the future position of the host vehicle, and sensor specification information indicating specifications of at least one external recognition sensor mounted on the host vehicle, wherein the sensor specification information is stored in a memory; and a vehicle control value determination process of determining a current control value of the host vehicle based on the blind spot area at the future time obtained by the blind spot area calculation process.

* * * * *